Patented Feb. 27, 1951

2,543,271

UNITED STATES PATENT OFFICE 2,543,271

BIPHENYL COMPOUNDS

Louis L. Bambas, Grosse Pointe Woods, Mich., assignor to Parke, Davis & Company, Detroit, Mich., a corporation of Michigan No Drawing. Application January 4, 1950,
Serial No. 136,837

9 Claims. (Cl. 260—501)

This application is a continuation in part of my co-pending application, Serial Number 83,778, filed March 26, 1949, now Patent No. 2,516,098, and the invention relates to new amino diols and to chemical methods useful for their synthesis. More particularly, the invention relates to biphenylyl amino diols and their acid addition salts and to methods for obtaining these products. The amino diol compounds of the invention in their free base form can be represented by the formula,

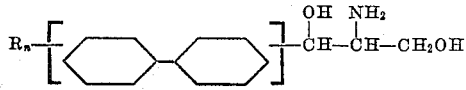

where $n$ is one of the integers 1 or 2 and R is the same or different and represents hydrogen, halogen, nitro, lower alkyl, or lower alkoxy radicals.

It will be appreciated by those skilled in the art that the amino diols of the invention and the starting materials used in their preparation can exist in structural as well as optical isomeric forms. The term "structural" isomer or form as used herein refers to the cis or trans, that is, the planar relationship of the polar groups on the two asymmetric carbon atoms. To differentiate between these two possible diastereo-isomers as the "pseudo" ($\psi$) series or form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of the optically active dextro (d) and levo (l) rotatory isomers as well as in the form of the individual or separated dextro (d) and levo (l) optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula the formula should be interpreted in its generic sense, that is, as representing the (l)-$\psi$, (d)-$\psi$, (l)-reg. or (d)-reg. isomers in separated form as well as the (dl)-$\psi$ or (dl)-reg. optical racemates or the total unresolved mixture of structural and optical isomers. Such a formula does not merely represent the unresolved mixture of isomers.

In accordance with the invention, amino diols of the above general formula are produced by hydrolyzing an acylated amino diol of the formula,

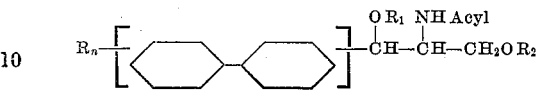

where R and $n$ have the same significance as given above and where $R_1$ and $R_2$ are the same or different and represent hydrogen or acyl radicals. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, ester substituted lower aliphatic acyl, hydroxy substituted lower aliphatic acyl, benzoyl, substituted benzoyl, araliphatic acyl, furoyl, pyridinoyl and the like radicals.

In carrying out the hydrolysis acidic or alkaline conditions can be used. However, we prefer to hydrolyze using dilute mineral acid since it is more efficient in bringing about hydrolysis in a shorter time. When acidic hydrolytic conditions are used, the substituted amino diol product is present in the reaction mixture in the form of an acid addition salt and it can either be isolated in this form or it can be neutralized and isolated as the free base. If desired, the hydrolysis may be carried out in a medium containing a water miscible organic solvent such as methanol, ethanol, dioxane, acetone, n-propanol, methyl ethyl ketone and the like. The reaction may be effected over a wide temperature range but is preferably carried out at the boiling point of the reaction mixture. Some specific examples of the hydrolytic catalysts or reagents which can be employed are hydrochloric acid, hydrobromic acid, hydriodic acid, sulfuric acid, phosphoric acid, sodium hydroxide, potassium hydroxide, lithium hydroxide, barium hydroxide, sodium carbonate, potassium carbonate and the like.

As stated above, the acid addition salts of the amino diols may be prepared directly by hydrolysis. These salts may also be prepared by the reaction of the free base with the corresponding organic or inorganic acid. Some examples of these acid addition salts are the hydrochloride, hydrobromide, hydriodide, sulfate, sulfamate, oxalate, tartrate, citrate, benzoate, maleate, succinate, acetate and the like.

In order to prepare a particular optical isomer of the amino diols, or acylated derivatives thereof, the corresponding individual, regular or pseudo, forms of the (4-biphenylyl)-2-aminopropane-1,3-diol are resolved into the optically isomers via and optical active addition salt. This resolution, which must be carried out on the free amino diol, is performed by forming an acid addition salt of the racemic amine with an optically active acid such as (d)-tartaric, (l)-tartaric, (d)-mandelic, (l)-mandelic, (d)-bromcamphor sulfonic, (l)-bromcamphor sulfonic, and (l)-camphor sulfonic acid, separating the two isomeric salts by recrystallization from a solvent, such as a lower aliphatic alcohol or mixtures of the same with water or other organic solvents, and then regenerating the individual optical isomers from the separated optically active acid addition salts by neutralizing each one separately. When carrying out this resolution, it is desirable but not absolutely necessary to choose the form of the optically active acid so that the desired optical isomer will separate from the crystallization solution first.

The process of resolution of the biphenylyl amino diols described above is also described and claimed in our co-pending application, Serial Number 136,838 filed under even date herewith.

The amino diols of the invention and their acid addition salts are valuable intermediates for the preparation of other organic compounds. They are of particular value in the preparation of organic compounds possessing antibiotic activity.

The invention is illustrated by the following examples:

*Example 1*

26 g. of (dl)-ψ-1-(4-biphenylyl)-2-acetamidopropane-1,3-diol is heated with 600 cc. of 5% hydrochloric acid for twelve hours. The reaction mixture is cooled and the hydrochloride salt of (dl)-ψ-1-(4-biphenylyl)-2-aminopropane-1,3-diol which separates is collected and washed with a small amount of water. The hydrochloride salt thus obtained is dissolved in water or suspended therein and the mixture treated with an excess of concentrated ammonium hydroxide. The (dl)-ψ-1-(4-biphenylyl)-2-aminopropane-1,3-diol free base which separates is collected, washed with a small amount of water and purified by recrystallization from water. The formula of this product is,

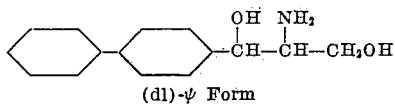

(dl)-ψ Form 5 g. of (dl)-ψ-1-(4-diphenylyl)-2-aminopropane-1,3-diol is dissolved in a minimum amount of water containing a small amount of methanol and the resulting solution is treated with an aqueous solution containing an equivalent amount of (d)-tartaric acid, the solution is evaporated to dryness in vacuo and the residue fractionally crystallized from a minimum amount of hot methanol. The first isomer to separate from the solution in crystalline form is the (d)-tartaric acid salt of (l)-ψ-1-(4-biphenylyl)-2-aminopropane-1,3-diol. The (d)-tartaric acid salt of (d)-ψ-1-(4-biphenylyl)-2-aminopropane-1,3-diol is recovered from the filtrate after removal of the salt of the (l)-isomer.

The (d)-tartaric acid of (l)-ψ-1-(4-biphenylyl)-2-aminopropane-1,3-diol obtained above is dissolved in water, the solution made alkaline to pH 9 with sodium hydroxide solution and the precipitated (l)-ψ-1-(4-biphenylyl)-2-aminopropane-1,3-diol free base is collected. The formula of this product is,

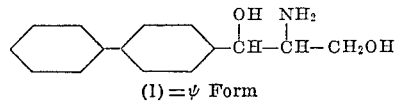

(l) = ψ Form

By decomposing the (d)-tartaric acid salt of (d)-ψ-1-(4-biphenylyl)-2-aminopropane-1,3-diol in the manner described above for the l-isomer, one obtains the free base of (d)-ψ-1-(4-biphenylyl)-2-aminopropane-1,3-diol. If desired the (d)-tartaric acid used above may be replaced by (d)-camphor sulfonic acid. In this instance, it is preferable to use a reaction mixture containing n-butanol rather than the methanol used in the fractional crystallization of the tartrate salt.

*Example 2*

11 g. of (dl)-ψ-1-(4'-methoxy-3-biphenylyl)-2-phenylacetamidopropane-1,3-diol is heated for twelve hours under reflux with 325 cc. of 5% hydrobromic acid.

The reaction mixture is cooled and the insoluble hydrobromide salt of (dl)-ψ-1-(4'-methoxy-3-biphenylyl)-2-aminopropane-1,3-diol is collected. The solid is dissolved in water, the solution made alkaline with sodium hydroxide to pH 10 and the free base of (dl)-ψ-1-(4'-methoxy-3-biphenylyl)-2-aminopropane-1,3-diol which separates collected. This product has the formula,

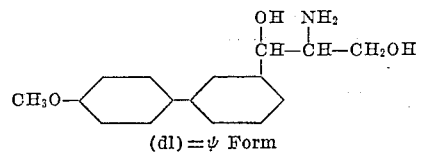

(dl) = ψ Form

*Example 3*

53 g. of (dl)-ψ-1-(4'-nitro-4-biphenylyl)-2-acetamidopropane-1,3-diol is added to 1600 cc. of 5% hydrochloric acid and the resulting mixture heated under reflux for about twelve hours. The reaction mixture is cooled and the hydrochloride salt of (dl)-ψ-1-(4'-nitro-4-biphenylyl)-2-aminopropane-1,3-diol which separates is collected and dissolved or suspended in water. The aqueous mixture is treated with an excess of concentrated ammonium hydroxide and the free base of (dl)-ψ-1-(4'-nitro-4-biphenylyl)-2-aminopropane-1,3-diol is collected and purified by recrystallization from water. The formula of this product is,

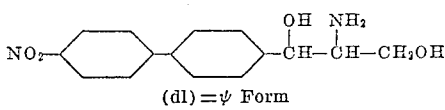

(dl) = ψ Form

Preparation of the optically active (d)-tartaric acid addition salt of the above (dl)-ψ-1-(4'-nitro-4-biphenylyl)-2-aminopropane-1,3-diol and fractional crystallization of the (d)- and the (l)-salts leads to crystalline products which upon hydrolysis yield separately (d)-ψ-1-(4'-nitro-4-biphenylyl)-2-aminopropane-1,3-diol and (l)-ψ-1-(4'-nitro-4-biphenylyl)-2-aminopropane-1,3-diol.

*Example 4*

5 g. of (dl)-reg.-1-(4'-ethyl-4-biphenylyl)-2-benzamido-3-dichloroacetoxypropane-1-ol is refluxed with 100 cc. of 5% sulfuric acid for four hours. The reaction mixture is evaporated to one-half volume in vacuo, the solution made alkaline to pH 10 with sodium hydroxide and extracted with ethyl acetate. The ethyl acetate extracts are dried and the ethyl acetate distilled to obtain the free base of (dl)-reg.-1-(4'-ethyl-4-biphenylyl)-2-aminopropane-1,3-diol of the formula,

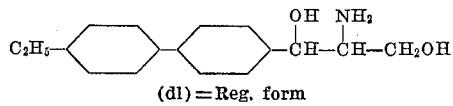

(dl)=Reg. form

*Example 5*

11 g. of (l)-ψ-1-(3'-bromo-3-biphenylyl)-2-methoxyacetamido-1,3-bis(methoxyacetoxy)-propane is heated under reflux with 200 cc. of 5% potassium hydroxide solution. After about three hours of heating, the reaction mixture is cooled and extracted with ethyl acetate. The extract is washed with water, dried and the ethyl acetate distilled. The product thus obtained is (l)-ψ-1-(3'-bromo-3-biphenylyl)-2-aminopropane-1,3-diol of the formula,

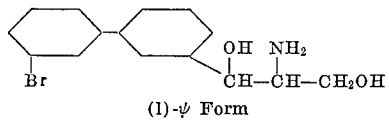

(l)-ψ Form 1 g. of the above free base is dissolved in a small amount of isopropanol and added to a warm isopropanol solution containing one equivalent of oxalic acid monohydrate. The resulting mixture is evaporated to dryness in vacuo, and the crystalline half-acid oxalate salt of (l)-ψ-1-(3'-bromo-3-biphenylyl)-2-aminopropane-1,3-diol is purified by recrystallization from isopropanol. The formula of this product is,

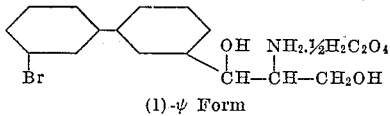

(l)-ψ Form

*Example 6*

4.2 g. of (l)-reg.-1-(2',4'-dichloro-4-biphenylyl)-2-benzamido-1,3-dibenzoyloxypropane is heated under reflux for three hours with 75 cc. of alcoholic 5% hydrobromic acid. The reaction mixture is evaporated to dryness in vacuo and the residue consists of the hydrobromide salt of (l)-reg.-1-(2',4'-dichloro-4-biphenylyl)-2-aminopropane-1,3-diol. A mixture of this salt with 75 cc. of water is made alkaline to pH 10 with sodium hydroxide solution. The solution is extracted with ethyl acetate and the extract washed with water, dried and the solvent distilled to obtain the desired (l)-reg.-1-(2',4'-dichloro-4-biphenylyl)-2-aminopropane-1,3-diol of the formula,

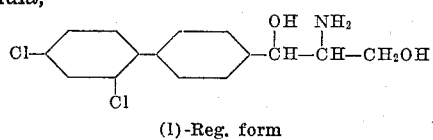

(l)-Reg. form

*Example 7*

8 g. of the (d)-ψ-1-(2-ethoxy-2'-methyl-4-biphenylyl)-2-dichloroacetamido-1,3-bis(dichloroacetoxy)propane is heated with 250 cc. of 5% hydrochloric acid for four hours. The reaction mixture is evaporated to dryness in vacuo. The residue which consists of (d)-ψ-1-(2-ethoxy-2'-methyl-4-biphenylyl)-2-aminopropane-1,3-diol hydrochloride of the formula,

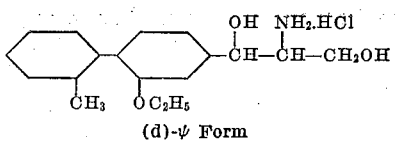

(d)-ψ Form is taken up in water, the solution made alkaline to pH 10 with sodium hydroxide and then extracted with two portions of ethyl acetate. The ethyl acetate extracts are dried and the ethyl acetate distilled to obtain the free base of (d)-ψ-1-(2-ethoxy-2'-methyl-4-biphenylyl)-2-aminopropane-1,3-diol which has the formula,

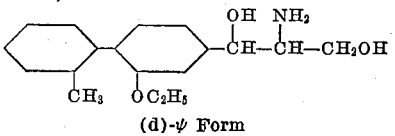

(d)-ψ Form

*Example 8*

8 g. of (dl)-reg.-1-(3-biphenylyl)-2-furamido-3-furoyloxypropane-1-ol is heated under reflux for three hours with 100 cc. of 5% hydrobromic acid and then the reaction mixture is evaporated to dryness in vacuo. The residual hydrobromide salt is taken up in water, the solution made alkaline to pH 10 with potassium hydroxide and extracted with ethyl acetate. The extract is washed with water, dried and the ethyl acetate distilled to obtain the desired (dl)-reg.-1-(3-biphenylyl)-2-aminopropane-1,3-diol of the formula,

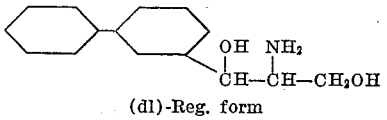

(dl)-Reg. form

*Example 9*

3.2 g. of (l)-ψ-1-(4'-nitro-4-biphenylyl-2-cyanoacetamidopropane-1,3-diol is refluxed for three hours with 200 cc. of 5% hydrochloric acid and then the reaction mixture is evaporated to dryness in vacuo. The residual (l)-ψ-1-(4'-nitro-4-biphenylyl)-2-aminopropane-1,3-diol hydrochloride is taken up in water and the solution made alkaline to pH 10 with sodium hydroxide and then extracted with ethyl acetate. The combined extracts are dried and the ethyl acetate removed by distillation under reduced pressure to obtain the desired (l)-ψ-1-(4'-nitro-4-biphenylyl)-2-aminopropane-1,3-diol of the formula,

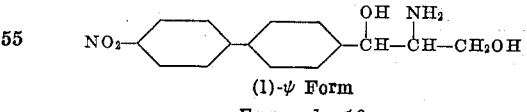

(l)-ψ Form

*Example 10*

9 g. of (l)-reg.-1-(4'-nitro-4-biphenylyl)-2-succinamido-1,3-bis(nicotinoyloxy)propane is refluxed with 150 cc. of 5% hydrochloric acid for six hours. The reaction mixture is evaporated to dryness in vacuo and the residue which consists of the hydrochloride of the desired amino diol is taken up with water. The solution is made alkaline to pH 10 with sodium hydroxide solution, extracted with ethyl acetate. The solvent is distilled from the extract to obtain the free base of (l)-reg.-1-(4'-nitro-4-biphenylyl)-2-aminopropane-1,3-diol of the formula,

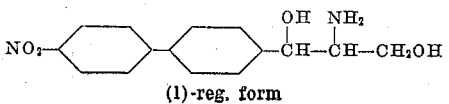

(l)-reg. form

In the foregoing examples, I have employed a new class of acylated amino diols as starting materials. These starting materials can be prepared in a number of different ways. One of the general methods which can be used to prepare the acylated amino diols is shown in the following diagram.

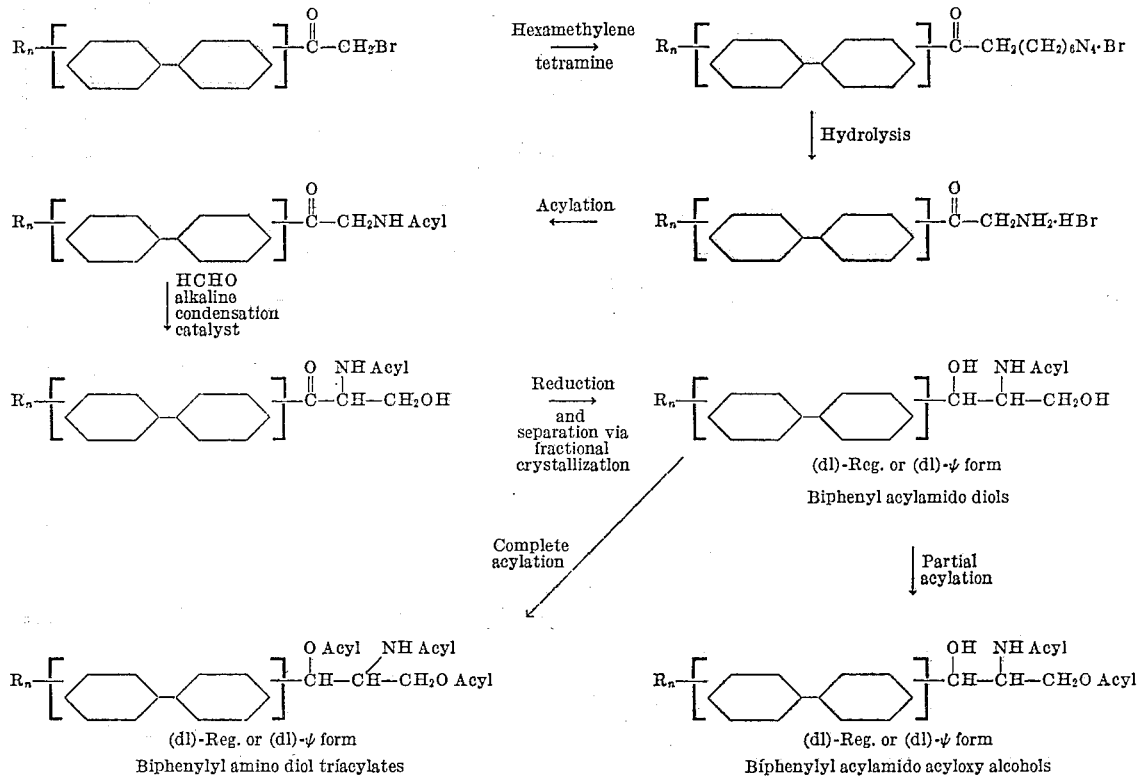

where R and $n$ have the same significance as given above. Preparation of the unresolved starting materials has not been shown in the above diagram but these products may be prepared by the indicated processes by omitting the steps of separating the structural and optical isomers. The following examples serve to illustrate the application of this general method for the preparation of some of the specific starting materials used in the foregoing examples.

(a) 75 g. of hexamethylenetetramine dissolved in chloroform is added to 125 g. of 4-biphenylyl bromomethyl ketone and the mixture allowed to stand at room temperature for about three hours. The 4-biphenylyl bromomethyl ketone-hexamethylenetetramine complex is collected, washed with a little chloroform and dried. The formula of this product is,

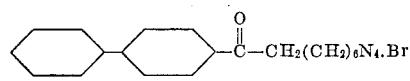

(b) 175 g. of the 4-biphenylyl bromomethyl ketone hexamethylenetetramine complex is added to 200 cc. of concentrated hydrochloric acid in 1 liter of absolute alcohol and the mixture stirred overnight. The insoluble hydrochloride salt of 4-biphenylyl aminomethyl ketone is collected by filtration, washed with a small amount of cold water and dried at room temperature. The formula of this product is,

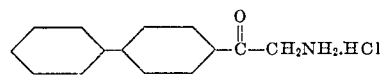

(c) The 4-biphenylyl aminomethyl ketone hydrochloride prepared in (b) is dissolved in 500 cc. of glacial acetic acid and 300 cc. of acetic anhydride. 150 g. of sodium acetate is added in small portions with stirring. After the addition has been completed the solution is diluted with water and the 4-biphenylyl acetamidomethyl ketone which separates collected and recrystallized from methanol; M. P. 154–5° C. The formula of this compound is,

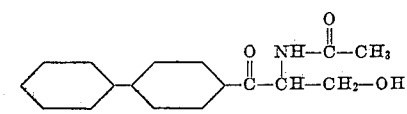

(d) 58 g. of 4-biphenylyl acetamidomethyl ketone is mixed with 300 cc. of methanol and 75 cc. of 40% neutral formalin. 2 g. of sodium bicarbonate is added and the mixture stirred at room temperature for about an hour during which time the desired solid product separates. The insoluble 4-biphenylyl α-acetamido-β-hydroxyethyl ketone of formula.

is collected and purified by recrystallization from ethyl acetate; M. P. 166–7° C.

(e) 50 g. of 4-biphenylyl-α-acetamido-β-hydroxyethyl ketone is mixed with 75 g. of aluminum isopropylate and 1 liter of isopropanol and the mixture heated under reflux for five hours. During the refluxing period the acetone which is formed is distilled off and a stream of nitrogen is passed through the solution. The isopropanol is distilled from the reaction mixture under reduced pressure and the residue treated with about 1 liter of water. The mixture is heated to boiling to insure complete precipitation of the aluminum hydroxide, filtered while hot and the filtrate allowed to cool. The (dl)-ψ-1-(4-biphenylyl)-2-acetamido-propane-1,3-diol which separates from the cool solution is collected by filtration and purified by recrystallization from 40% ethanol; M. P. 190–1° C. The formula of this product is,

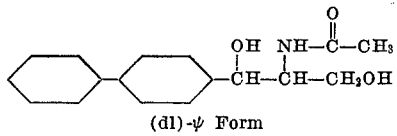

(dl)-ψ Form

If desired, the corresponding (dl)-reg. isomer may be recovered from the aqueous filtrates.

(f) 10 g. of (dl)-ψ-1-(4-biphenylyl)-2-dichloroacetamidopropane-1,3-diol is added to 20 cc. of acetic anhydride and 25 cc. of dry pyridine. The mixture is heated at 70° C. for two hours and is then evaporated in vacuo. The residue is treated with water and the solid (dl)-ψ-1-(4-biphenylyl)-2-dichloroacetamido-1,3-diacetoxypropane is collected and recrystallized from ethyl acetate. The formula of this product is,

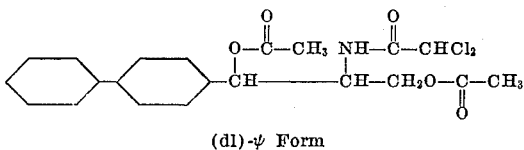

(dl)-ψ Form

While the above examples of the preparation of starting material describe only the biphenylyl derivatives unsubstituted on the ring, it should be understood that such examples are fully operative where the biphenylyl ring does carry substituents in conformance with the designation of the symbol R and n as previously described.

Some of the subject matter disclosed but not claimed herein is described and claimed in my co-pending applications Serial Nos. 135,831, 136,832, 136,833, 136,834, 136,835, 136,836 and 136,838, all filed January 4, 1950, as continuations-in-part of my application Serial No. 83778, now Patent No. 2,516,098.

What I claim is:

1. A compound of the class consisting of a free base and its acid addition salts, said free base having the formula,

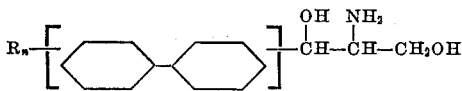

where $n$ is one of the integers 1 and 2 and R is a member of the class consisting of hydrogen, halogen, nitro, lower alkyl and lower alkoxy radicals.

2. A 1-(4-biphenylyl)-2-aminopropane-1,3-diol compound of the formula,

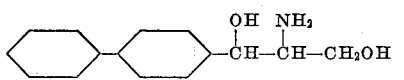

3. (dl)-ψ-1-(4-biphenylyl)-2-aminopropane-1,3-diol.

4. (l)-ψ-1-(4-biphenylyl)-2-aminopropane-1,3-diol.

5. An acid addition salt of a 1-(4-biphenylyl)-2-aminopropane-1,3-diol compound having the formula,

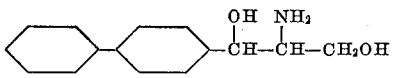

6. The d-tartaric acid salt of (l)-ψ-1-(4-biphenylyl)-2-aminopropane-1,3-diol.

7. A 1-(4'-nitro-4-biphenylyl)-2-aminopropane-1,3-diol compound of the formula,

NO₂—⟨⟩—⟨⟩—CH—CH—CH₂OH
                    |   |
                    OH  NH₂

8. (dl)-ψ-1-(4'-nitro-4-biphenylyl)-2-aminopropane-1,3-diol.

9. (l)-ψ-1-(4'-nitro-4-biphenylyl)-2-aminopropane-1,3-diol.

LOUIS L. BAMBAS.

No references cited.